Nov. 7, 1961 S. A. MAKOVSKI 3,007,184

IMPROVEMENTS IN METHODS OF MOLDING OUTSOLES TO SHOES

Filed May 12, 1959

Inventor
Stephen A. Makovski
By his Attorney

United States Patent Office 3,007,184
Patented Nov. 7, 1961

3,007,184
IMPROVEMENTS IN METHODS OF MOLDING OUTSOLES TO SHOES
Stephen Akroyd Makovski, Leicester, England, assignor to United Shoe Machinery Corporation, Flemington, N.J., a corporation of New Jersey
Filed May 12, 1959, Ser. No. 812,652
Claims priority, application Great Britain June 11, 1958
1 Claim. (Cl. 12—145)

This invention relates to the manufacture of shoes and is herein illustrated in its application to methods of making shoes involving the molding of outsoles onto the overlasted margins of shoe uppers.

In the manufacture of light weight shoes such as slippers, it has been found desirable to reduce the weight of a molded sole by incorporating therein light weight filler substance such, for example, as felt. When the filler material is placed in the mold cavity prior to the mold operation, in accordance with the usual practice, it sometimes happens that portions of filler materials are displaced in the molding operation so that they are visible in the tread surface of the molded sole thus detracting both from the appearance and from the wearing qualities of the sole.

It is an object of the present invention to correct this condition by providing a method of making shoes of the type above described in which the outsole is molded before the filler material is incorporated in the shoe bottom.

It is a further object of the invention to provide a method of making such shoes wherein the flow of soling material into spaces between the overlasted margin of the upper and the shoe form on which the upper is shaped is prevented and the soling material is retained in its proper position below the overlasted margin.

With the above objects in view the present invention in one aspect thereof comprises a method of making shoes which consists in lasting a shoe upper to a form having in its bottom or sole portion a filler-shaped land. Preferably the shoe form on which the upper is lasted is the work supporting member of a machine for molding outsoles onto shoe bottoms such, for example, as the machine illustrated and described in an application for United States Letters Patent Serial No. 753,228, filed August 5, 1958, in the names of Willard L. Baker et al. The bottom margin of the upper is secured in overlasted position with its inner surface in contiguous relation to the margin of the sole portion of the form and its edge in abutting relation to the wall of the land in order to prevent the flow of soling material into spaces between the overlasted margin and the sole portion of the form. The upper is lasted to the shoe form by a drawing action on a lasting cord incorporated in the bottom margin of the upper. In order to bring that portion of the lasting margin at the inside of the shank into abutting relation to the wall of the land the end portions of the lasting cord are drawn through a transverse groove formed in the shank portion of the land, said end portions then extending from the outside to the inside of the shank. At the inside of the shank the ends of the cord are passed about that portion of the cord carried by the lasting margin at the inside of the shank. Thereupon tension is applied to the end portions of the cord widthwise of the land, thereby to draw the lasting margin—particularly that portion of the margin in the inside of the shank, into abutting relation to the wall of the land. The lasting cord is then secured in any appropriate manner and the shoe is ready for the molding of an outsole thereon.

The invention will now be described with reference to the accompanying drawings and pointed out in the appended claim.

In the drawings,

FIG. 1 is a cross section illustrating a portion of a novel shoe form employed in a plastic injection sole molding machine of the type illustrated in the application for United States Letters Patent hereinbefore referred to;

Figure 1:
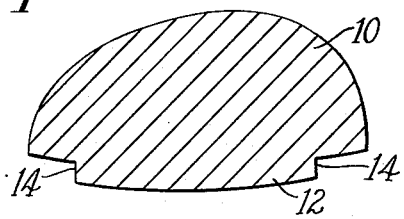
Figure 2:
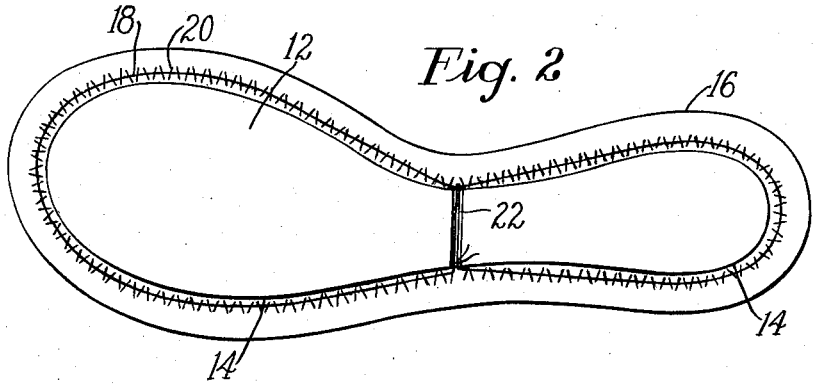
FIG. 2 is a bottom view illustrating the shoe form and the bottom margin of a shoe upper string-lasted thereon.

The illustrated shoe form, which is preferably made of metal, comprises a body portion 10 of conventional construction having on its bottom surface a land 12 having a shape and disposition corresponding to the shape and disposition of a filler substance to be incorporated in the shoe bottom. The land 12 has a downwardly extending edge face or wall 14 which is preferably spaced inwardly from the edge of the bottom or sole portion of the shoe form to an extent corresponding to the width of the lasting margin of a shoe upper such, for example, as the upper 16 illustrated in the drawings. The illustrated shoe upper has a cord 18 attached to its lasting margin by zig-zag stitches 20. The upper is mounted on the shoe form in unlasted condition and tension is applied to the cord in accordance with the usual string-lasting procedure in order to draw the lasting margin inwardly into contiguous relation to the bottom margin of the shoe form. In the lasting operation the edge of the lasting margin is brought into abutting relation to the edge face 14 of the land 12. A transverse groove 22 (FIG. 2) is provided in the land 12 in the region of the shank portion of the shoe form to receive the knotted portion of the cord 18.

Figure 3:
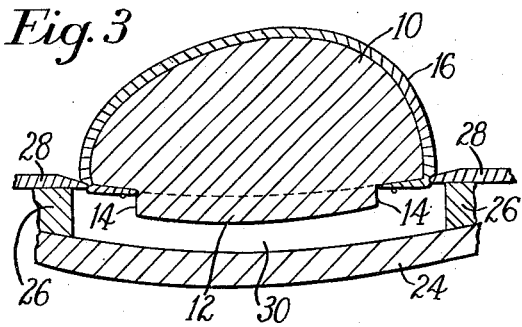
FIG. 3 is a sectional view taken on the same plane as FIG. 1 illustrating the shoe form and an upper lasted thereon relatively to the mold elements of a plastic injection sole molding machine.
Figure 4:
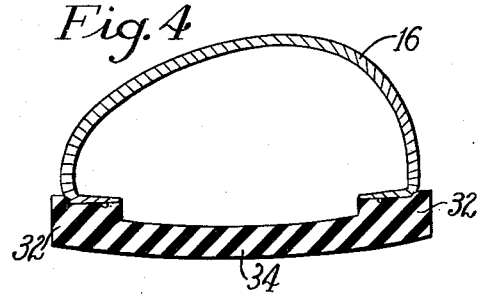
FIG. 4 is a section taken on the same plane as FIG. 3 showing the upper and a sole member molded thereon, the assembly having been removed from the shoe form.
Figure 5:
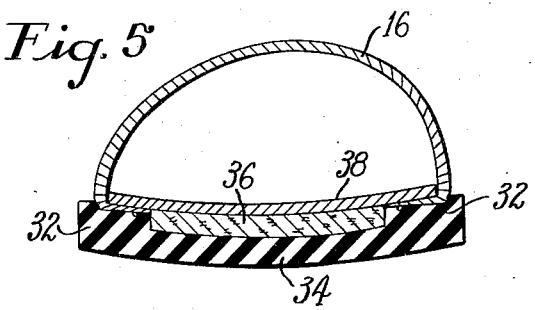
FIG. 5 is a section taken on the same plane as FIG. 4 showing the shoe assembly with bottom filler and an insole or sock lining incorporated therein.

After the upper has been lasted to the shoe form, as above described, the form is positioned relatively to the mold elements of the machine comprising a bottom mold member 24 and two side mold members 26 having attached thereto crease plates 28. After the shoe form is so positioned the side mold members 26 are advanced into their position illustrated in FIG. 3 to close the mold cavity and to bring the crease plates into engagement with the feather line portion of the shoe upper. It will be seen that the closing of the side mold members completes the formation of a mold cavity 30 into which the land 12 projects to occupy the space in the shoe bottom into which the filler substance will later be inserted. Suitable plastic material in fluid condition such, for example, as a compound of polyvinyl chloride is then injected into the mold cavity 30 through a suitable port (not shown) in the bottom mold member 24 by the operation of the machine disclosed in the application for United States Letters Patent hereinbefore referred to. Upon the completion of the filling of the mold cavity the plastic injecting operation is automatically terminated. As shown in FIG. 4 the molded sole member comprises a relatively thick marginal portion 32 attached to the lasting margin of the upper 16 and a relatively thin central portion 34.

In order to insure an adequate and reliable adhesive attachment or bond between the sole and the lasting margin of the upper the exposed or grain surface of the lasting margin carries a coating of a suitable priming material or adhesive compatible with the composition of the sole member and capable of impregnating the upper material. Such priming material will have been applied to the lasting margin prior to the lasting operation, for example by suitable spraying apparatus, using an appropriate mask to prevent the application of priming material to the upper beyond the feather line.

The cavity 30 formed in the sole member in the molding operation is filled with a suitable substance 36 which may be secured to the base and the walls of the cavity by a suitable adhesive. An insole or sock lining 38 is then inserted into the shoe and arranged to cover the filler substance and the inner surface of the lasting margin.

It will be seen that the illustrated shoe is characterized by the fact that the filler substance is confined within the cavity 30 and no portion thereof protrudes through the tread surface of the sole, and is further characterized by the fact that the plastic substance of the sole member has not encroached upon the inner or foot facing surface of the lasting margin at any point in the shoe bottom.

Having thus described my invention, what I claim as new and desire to secure by Letters Patent of the United States is:

That method of making shoes which comprises providing a shoe upper having a lasting cord in its lasting margin, mounting the upper on a shoe form of a machine for molding outsoles onto shoe bottoms, said shoe form having a filler-shaped land in its bottom portion, drawing the cord to bring the lasting margin into contiguous relation to the bottom of the form and to bring the edge of the lasting margin into abutting relation to the wall of the land at the end portions thereof, inserting the end portions of the cord into a transverse groove formed in that portion of the land situated at the shank portion of the insole, passing the end portions of the cord about a portion of the cord extending longitudinally of the insole, and applying tension to the end portions of the cord widthwise of the insole thereby to draw those portions of the lasting margin at opposite sides of the shank portion of the insole inwardly into abutting relation to the wall of the land.

References Cited in the file of this patent

UNITED STATES PATENTS

| | | |
|---|---|---|
| 1,855,780 | Thoma | Apr. 26, 1932 |
| 2,210,753 | Field | Aug. 6, 1940 |
| 2,605,559 | Vail | Aug. 5, 1952 |
| 2,694,871 | Rollman | Nov. 23, 1954 |
| 2,799,034 | Crowell et al. | July 16, 1957 |
| 2,815,589 | Sears | Dec. 10, 1957 |

FOREIGN PATENTS

| | | |
|---|---|---|
| 1,158,139 | France | Jan. 13, 1958 |
| 1,189,039 | France | Mar. 16, 1959 |